US008090261B2

(12) United States Patent
Sugawara et al.

(10) Patent No.: US 8,090,261 B2
(45) Date of Patent: Jan. 3, 2012

(54) NETWORK SYSTEM, OPTICAL LINE TERMINATING APPARATUS, AND OPTICAL NETWORK APPARATUS

(75) Inventors: Toshiki Sugawara, Kokubunji (JP); Hiroki Ikeda, Hachioji (JP); Yusuke Yajima, Fujisawa (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 733 days.

(21) Appl. No.: 12/073,949

(22) Filed: Mar. 12, 2008

(65) Prior Publication Data
US 2009/0169209 A1    Jul. 2, 2009

(30) Foreign Application Priority Data

Dec. 26, 2007   (JP) .................................. 2007-333446

(51) Int. Cl.
*H04J 14/00*    (2006.01)
(52) U.S. Cl. ................ 398/67; 398/72; 398/68; 398/25; 398/100; 398/38; 370/352; 370/392; 370/389; 370/468; 370/465; 725/105; 725/106; 725/125; 725/127; 725/129
(58) Field of Classification Search .................... 398/66, 398/67, 68, 69, 70, 71, 72, 79, 33, 177, 38, 398/25, 26, 27, 158, 159, 160, 91, 92, 93, 398/94, 95, 135, 136, 137, 192, 193, 194, 398/195, 196, 197, 198, 202, 208, 209, 210, 398/58, 59, 98, 99, 100, 182, 183, 43; 370/352, 370/392, 389, 468, 465; 725/105, 106, 125, 725/127, 129
See application file for complete search history.

(56) References Cited

U.S. PATENT DOCUMENTS

| 5,790,289 A * | 8/1998 | Taga et al. ........................ 398/79 |
| 6,185,022 B1 * | 2/2001 | Harasawa ........................... 398/9 |
| 6,847,788 B2 * | 1/2005 | Nakajima et al. ............. 398/149 |
| 2006/0120727 A1 * | 6/2006 | Lee et al. ....................... 398/135 |
| 2008/0031621 A1 * | 2/2008 | Kuo et al. ........................ 398/26 |

FOREIGN PATENT DOCUMENTS

JP    2007-22157    8/2007

OTHER PUBLICATIONS

"Gigabit-Capable Passive Optical Networks (G-PON): Transmission Convergence Layer Specification", Series G: Transmission Systems and Media, Digital Systems and Networks, G.984.3, International Telecommunication Union, (Feb. 2004), pp. i-iv and 1-107.

(Continued)

*Primary Examiner* — Hanh Phan
(74) *Attorney, Agent, or Firm* — Crowell & Moring LLP

(57) ABSTRACT

A general object of the present invention is to provide an optical communication system in which an optical transmission power of an optical communication apparatus is controlled to be a required minimum power that apparatuses of all subscribers in the optical communication system meet a prescribed error rate. An optical line terminating apparatus (OLT) transmits data to multiple optical network apparatuses (ONUs) at an optical intensity calculated based on information acquired from the multiple ONUs, which is related to optical intensities of signals that the multiple ONUs receive from the OLT, the optical intensity being calculated so that a minimum optical intensity of the optical intensities of the signals is greater than a predetermined value.

34 Claims, 7 Drawing Sheets

Legend
10: OLT Transmitter/Receiver
11: Reception Logic Module
12: Reception Analog Front End
13: Optical Receiver
14: WDM
21: Light Source
22: Transmission Analog Front End
23: Transmission Logic Module 100: ONU Transmitters/Receivers
101: Transmission Logic Module
102: Transmission Analog Front End
103: Light Source
104: WDM
105: Optical Receiver
106: Reception Analog Front End
107: Reception Logic Module
301: Out Power Controller
401: Power Monitor
402: Reception Information Transmitter

OTHER PUBLICATIONS

"Gigabit-Capable Passive Optical Networks (G-PON): Transmission Convergence Layer Specification", Amendment 1, Series G: Transmission Systems and Media, Digital Systems and Networks, G.984.3, International Telecommunication Union, (Jul. 2005), pp. i-iv and 1-38.

"Gigabit-Capable Passive Optical Networks (G-PON): Transmission Convergence Layer Specification", Amendment 2, Series G: Transmission Systems and Media, Digital Systems and Networks, G.984.3, International Telecommunication Union, (Mar. 2006), pp. i-iii and 1-4.

"Physical Medium Dependent (PMD) Sublayer and Medium, Type 1000BASE-PX10 and 1000BASE-PX20 (Long Wavelength Passive Optical Networks)", Revision of IEEE Sid 802.3, 2005, pp. 121-148.

"Digital Sections and Digital Line System—Optical Line Systems for Local and Access Networks", Series G: Transmission Systems and Media, Digital Systems and Networks, G.984.1, International Telecommunication Union, (Mar. 2003), pp. i-iii and 1-14.

"Digital Sections and Digital Line System—Optical Line Systems for Local and Access Networks", Series G: Transmission Systems and Media, Digital Systems and Networks, 0.984.2, International Telecommunication Union, (Mar. 2003), pp. i-iii and 1-29.

"Digital Sections and Digital Line System—Optical Line Systems for Local and Access Networks", Amendment 1: New Appendix III-Industry Best Practice for 2.488 Gbit/s Downstream, 1.244 Gbit/s Upstream G-PON, Series G: Transmission Systems and Media, Digital Systems and Networks, G.984.2, International Telecommunication Union, (Feb. 2006), pp. i-iv and 1-3.

First Office Action from State Intellectual Property Office of the People's Republic of China for Chinese Application No. 200810090061.6., Mar. 31, 2008.

\* cited by examiner

FIG. 1

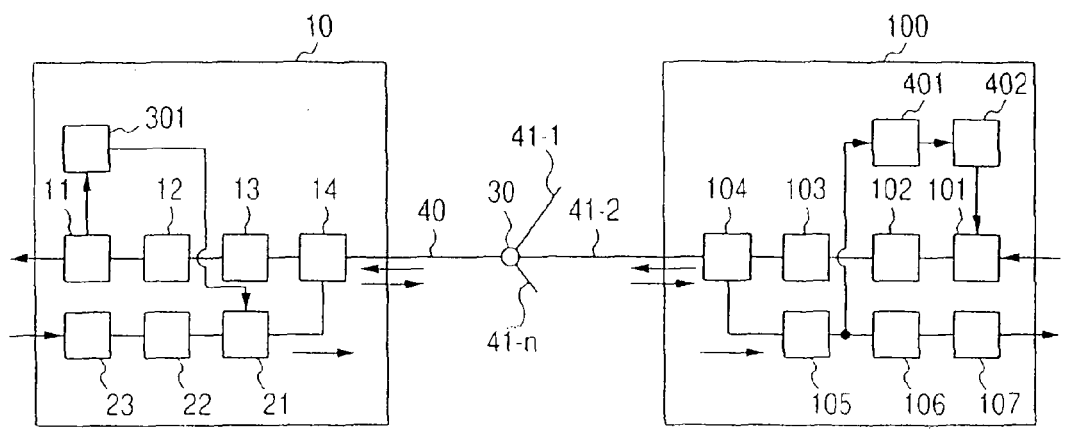

Legend
10: OLT Transmitter/Receiver
11: Reception Logic Module
12: Reception Analog Front End
13: Optical Receiver
14: WDM
21: Light Source
22: Transmission Analog Front End
23: Transmission Logic Module 100: ONU Transmitters/Receivers
101: Transmission Logic Module
102: Transmission Analog Front End
103: Light Source
104: WDM
105: Optical Receiver
106: Reception Analog Front End
107: Reception Logic Module
301: Out Power Controller
401: Power Monitor
402: Reception Information Transmitter Legend
21: Light Source
205: Optical Amplifier
206: Electro-Optical Conversion Unit Legend
103: Light Source
207: Optical Amplifier
208: Electro-Optical Conversion Unit

NETWORK SYSTEM, OPTICAL LINE TERMINATING APPARATUS, AND OPTICAL NETWORK APPARATUS

CLAIM OF PRIORITY

The present application claims priority from Japanese application JP 2007-333446 filed on Dec. 26, 2007, the content of which is hereby incorporated by reference into this application.

FIELD OF THE INVENTION

The present invention relates to an optical communication system used for the Passive Optical Network (PON) in which the Time Division Multiple Access (TDMA) and the Wavelength Division Multiple Access (WDMA) are concurrently used, in a signal multiplexing technology when constituting an optical access network.

BACKGROUND OF THE INVENTION

As services have been diversified on networks, we have widely used those new services which make use of advantages of networks. A typical example of the movements is a broadcasting and communication converged service, that is, an integrated service of broadcasting, Internet, and telephone (voice communication), which is called a triple-play service. In order to realize the triple-play service, constitution of Fiber To The Home (FTTH) by the PON system is becoming the main stream in access networks. In the PON system, multiple subscribers commonly use the optical fibers installed from the central office to the optical splitters, and the equipment of the central office. This common use enables a significant reduction of the network installation cost and maintenance cost by sharing those costs among subscribers. The FTTH system using the PON technology is a media sharing type network system described above, and a bandwidth a subscriber can use is nearly the same as that of what the maximum throughput of the system is divided by the number of subscribers who share the system. Since all subscribers rarely access the system at a same time, a subscriber can substantially use a wider bandwidth due to the statistical multiplex effect. Such broadband performance of the FTTH system by the PON becomes important for practicing a comfortable triple play service. The current PON systems are as follows: GE-PON by ITU-T (ITU-T G.984.1 "Gigabit-capable Passive Optical Networks (G-PON): General characteristics", ITU-T G.984.2 "Gigabit-capable Passive Optical Networks (G-PON): Physical Media Dependent (PMD) layer specification", ITU-T G.984.3 "Gigabit-capable Passive Optical Networks (G-PON): Transmission convergence layer specification"); GE-PON (IEEE standard) (IEEE 802.3ah "CSMA/CD Access Method and Physical Layer Specifications Amendment: Media Access CONUrol Parameters, Physical Layers, and Management Parameters for Subscriber Access Networks." For example, in the G-PON system, an apparatus of the central office (OLT; Optical Line Terminal) corresponds to a maximum of 64 sets of apparatuses of subscribers (ONU; Optical Network Unit) via 2.4 Gbps high-speed optical lines. As a mechanism to make the above sharing of the OLT possible, the collision avoidance control is provided in the system. Each optical signal (upstream signal) output from each ONU, after passing through an optical splitter, is superposed one on another, the superposed signals being output toward the OLT. In order for the OLT to be able to receive these multiple signals separately, each signal from each ONU must reach the OLT at a different timing without each signal not being superposed one on another. For this purpose, the collision avoidance control is adopted in the system and an output timing of an optical signal is controlled. The standardization organizations (ITU-T, IEEE) have now started the study of the next generation PON to be a successor of these present PON systems. To make the PON system further broader, the TDMA method used in the present POM must be improved so as to have a further higher-speed and a higher bit rate. The wavelength multiplex transmission technology is used in the triple play service in the PON system: wavelength range of 1550 to 1560 nm is assigned to the video transmission system; for the PON system, 1490 nm band data optical signal is assigned to optical signals of from the OLT to the ONT (downstream signals), while 1300 nm band data optical signal is assigned to optical signals of from the ONT to OLT. In a next generation PON system aiming 10 Gbps as a transmission speed thereof, there is a need to share optical fibers with the existing GE-PON system and G-PON system to constitute the system.

SUMMARY OF THE INVENTION

However, in an optical transmission system having its bit rate of 10 Gbps, transmission speed and transmission distance are significantly limited by the phenomena, such as deterioration of receive sensitivity, and wavelength dispersion of an optical fiber due to its high-speed. The deterioration of receive sensitivity is caused by the deterioration of S/N ratio due to an increase of noise which follows its higher-speed. For example, if a signal speed is four times higher, a receive sensitivity deteriorates by $¼$ (6 dB). Therefore, an optical transmission output must be increased, and the way of adopting an optical amplifier is considered promising. However, when an optical amplifier with a large output is adopted, it causes a serious problem in that an optical surge, that is, an overshoot caused by a high gain optical amplifier can destroy a receiver.

With respect to the wavelength dispersion, the wavelength dispersion refers to a phenomenon in which lights having different wavelengths propagate inside an optical fiber at different speeds. Since an optical spectrum of an optical signal modulated at a high-speed contains different wavelength components, the components reach a receiver at different times while propagating an optical fiber. As a result, a waveform of an optical signal causes a distortion after passing through a fiber. In order to suppress such waveform deterioration caused by the wavelength dispersion, there is a dispersion compensation technology. In the dispersion compensation technology, an optical element, which has the wavelength dispersion characteristics opposite to that of an optical fiber used in a transmission line, is disposed in an optical transmitter, a receiver, or a relay or the like, thereby aiming to cancel the wavelength dispersion characteristics of the optical fiber and to prevent waveform deterioration from happening. As such an optical element, that is, a dispersion compensator, a device such as a dispersion compensation fiber or an optical fiber grating, which has an opposite dispersion characteristics, has been studied and attempted to be practiced. However, a dispersion compensator is very expensive to be used in the PON system, therefore it is very difficult to be adopted really. As an alternative way of not using a dispersion compensator, use of a low chirp external modulator can be considered. A chirp refers to a minute and dynamic wavelength variation happened when modulating an optical carrier emitted from a communication laser in an optical communications system. The chirp causes a group delay in accordance with a wavelength dispersion value of an optical transmission line, and causes a waveform of an optical signal pulse to be distorted, resulting in the deterioration of transmission quality. When directly modulating a laser beam for a wavelength of 1490 nm or more which is used in the PON system, it is difficult to realize 20 km of transmission distance due to the influences of the chirp and the dispersion. Thus, it is thought that a way of adopting an EA (Electro-Absorption) modulator which uses the electro-absorption effect of a semiconductor is promising in this case. The reason is as follows: since the EA uses a semiconductor material, the EA is easy to be integrated with an external modulator and a laser together, which can reduce a cost up in comparison with a modulator used an optical crystal having an electro-optical effect, such as LiNbO3. In fact, using such a modulator makes more expensive than a way of directly modulating a laser beam; however, the cost up factor is not a serious one, because, in the PON system, multiple subscribers share the equipment of the central office and the cost for the equipment is divided by the number of the subscribers.

As described above, in an optical transmission system of 10 Gbps or more, the optical transmission power needs to be increased in order to secure a big loss budget. However, due to an increased power, the power consumption of the optical transmitter increases, causing an optical device to be subjected to a bigger burden and become difficult to acquire reliability over a long period of time, or to become larger in its size because of a mechanism for releasing heat. In addition, when adopting an optical amplifier, a problem in that a receiver might be destroyed by an optical surge is serious.

In view of those circumstances, a general object of the present invention is to provide an optical communication system in which an optical transmission power which is outputted from an optical transmission unit of an optical communication apparatus, is controlled to be a required minimum power that apparatuses of all subscribers in the optical communication system meet a prescribed error rate.

An optical line terminating apparatus transmits data to multiple optical network apparatuses at an optical intensity calculated based on information acquired from the multiple optical network apparatuses, which is related to optical intensities of signals that the multiple optical network apparatuses receive from the optical line terminating apparatus, the optical intensity being calculated so that a minimum optical intensity of the optical intensities of the signals is greater than a predetermined value.

According to the present invention, an optical communication system for access, which is excellent in the transmission quality, of low power consumption, simple and inexpensive, can be constituted. Furthermore, when adopting an optical amplifier, the present invention can solve a problem of optical surge and provide a highly-reliable optical communication system.

BRIEF DESCRIPTION OF THE DRAWINGS

FIG. 1 shows a basic structure of the PON system according to one embodiment of the present invention;

DETAILED DESCRIPTION OF THE PREFERRED EMBODIMENTS

Figure 2:
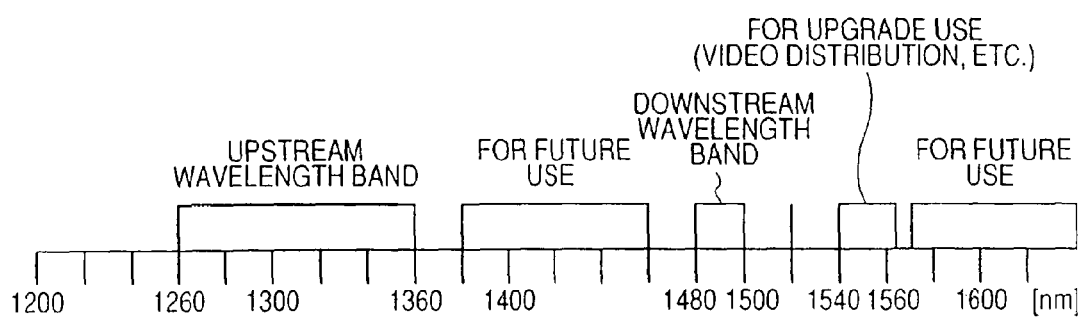
FIG. 2 shows a wavelength arrangement of the PON system according to one embodiment of the present invention.

Hereinafter, embodiments of the present invention will be described in detail with reference to accompanying drawings.

FIG. 1 shows a structure of the PON system according to the present invention. The PON system includes an optical communication apparatus (OLT) transmitter/receiver 10 which is placed on the side of a central office, and one or more optical communication subscriber apparatus (ONU) transmitters/receivers 100 on the side of users. Those apparatuses are connected together by optical fibers 40 and 41, and an optical splitter 30. The OLT transmitter/receiver 10 includes a WDM 14, an optical receiver 13, a reception analog front end 12, a reception logic module 11, a transmission logic module 23, a transmission analog front end 22, a light source with modulation function 21, and an output power controller 301. The ONU transmitter/receiver 100 includes a WDM 104, an optical receiver 105, a reception analog front end 106, a reception logic module 107, a transmission logic module 101, a transmission analog front end 102, a light source with modulation function 103, a power monitor 401, and a reception information transmitter 402.

Content of processing a signal will be described along with a signal flow. First, with respect to an optical signal from the OLT to the ONU (downstream signal), an electronic signal subjected to the PON frame processing by the transmission logic module 23, is amplified by the transmission analog front end 22 so as to obtain a sufficient driven power to be modulated at the light source with modulation function 21. The amplified signal is modulated by the light source with modulation function 21 and subsequently changed to an optical signal to be output. The light source with modulation function 21 can practice modulation by directly modulating a laser beam when a bit rate is up to about 2.5 Gbps. In the G-PON system or the GE-PON system, a modulated optical signal utilizes a wavelength of 1.49 μm band. After passing the WDM 14, the modulated optical signal is transmitted to the optical fiber 40. When a bit rate is about 10 Gbps, the light source with modulation function 21 is practiced by combining with a laser and an external EA modulator, or by integrating them together, due to the effect of the wavelength dispersion mentioned before. A modulated optical signal used for the 10 Gbps PON is a wavelength of 1.57 μm band or more (L band). After passing the WDM 14, the modulated optical signal is transmitted to the optical fiber 40. When an optical signal has a high power, the light source with modulation function 21 may be provided with an optical amplifier.

The optical signal passes the fiber 40, the optical splitter 30, and the fiber 41 and is inputted in the ONU transmitter/receiver 100. In the ONU transmitter/receiver 100, a wavelength component of 1.49 μm band, or a wavelength of 1.57 μm band is separated from the optical signal by the WDM 104. The optical signal is then input in the optical receiver 105. As the optical receiver 105, a photodiode (PD) is used, and more specifically, a PIN type PD using a semiconductor having PIN junction is used, or when high sensitivity is required, an APD (avalanche photodiode) is used. A minor-change in the current output from the PD is converted to a change in volume, followed by being amplified and output at the reception analog front end 106. The output signal is subjected to the PON frame processing by the reception logic module 107.

Next, an optical signal from the ONU to the OLT (upstream signal) will be described. The signal subjected to the PON frame processing is inputted in the ONU transmitter/receiver 100 after processed by the reception logic module 101. The electronic signal is amplified by the transmission analog front end 102 so as to obtain a sufficient driven power to be modulated at the light source with modulation function 103. The amplified signal outputs a modulated optical signal to the light source with a modulation function 103. The light source with modulation function 103 can practice modulation by directly modulating a laser beam when a bit rate is up to about 2.5 Gbps. When a bit rate is about 10 Gbps, the light source with modulation function 21 is practiced by combining with a laser and an external EA modulator, or by integrating them together, due to the effect of the wave length dispersion mentioned before. In the G-PON system or the GE-PON system, a modulated optical signal utilizes a wavelength of 1.3 μm band. After passing the WDM 104, the modulated optical signal is transmitted to the optical fiber 41. The optical signal passes the fiber 41, the optical splitter 30, and the optical fiber 40 and then input in the OLT transmitter/receiver 10. In the OLT transmitter/receiver 10, a wavelength component of 1.3 μm band is separated from the optical signal by the WDM 14. The optical signal is then input in the optical receiver 21. As the optical receiver 13, a photodiode (PD) is used, and more specifically, a PIN type PD using a semiconductor having PIN junction is used. When high sensitivity is required for the optical receiver 13, an APD is used. A minor change in the current output from the PD is converted to a change in volume, followed by being amplified and output at the reception analog front end 12. The output signal is subjected to the PON frame processing by the reception logic module 11.

An arrangement of the wavelength band used in the PON system according to the present invention will be described with reference to FIG. 2. In the present embodiment, bidirectional signals are transmitted within a single optical fiber by using a wavelength of 1.49 μm band for a downstream signal, and a wavelength of 1.3 μm band for an upstream signal. In addition, an optical signal having a wavelength of 1.55 μm band may also be multiplexed to the downstream signal for video distribution. Alternatively, the wavelength of 1.55 μm band may be reserved for upgrade use of the system. These multiplexed optical signals are demultiplexed on the side of the central office or subscribers, therefore a subscriber can enjoy multiple services by connecting one optical fiber.

In the PON system, a downstream signal output from the OLT can be received by all ONUs, that is, the PON system has a multiple address function. Therefore, the OLT writes a downstream signal for each packet or cell in a header. The ONU receives only a signal addressed to the ONU itself. On the other hand, with respect to an upstream signal, a collision avoidance technology is adopted, which will be described with reference to FIGS. 3 and 4.

Figure 3:
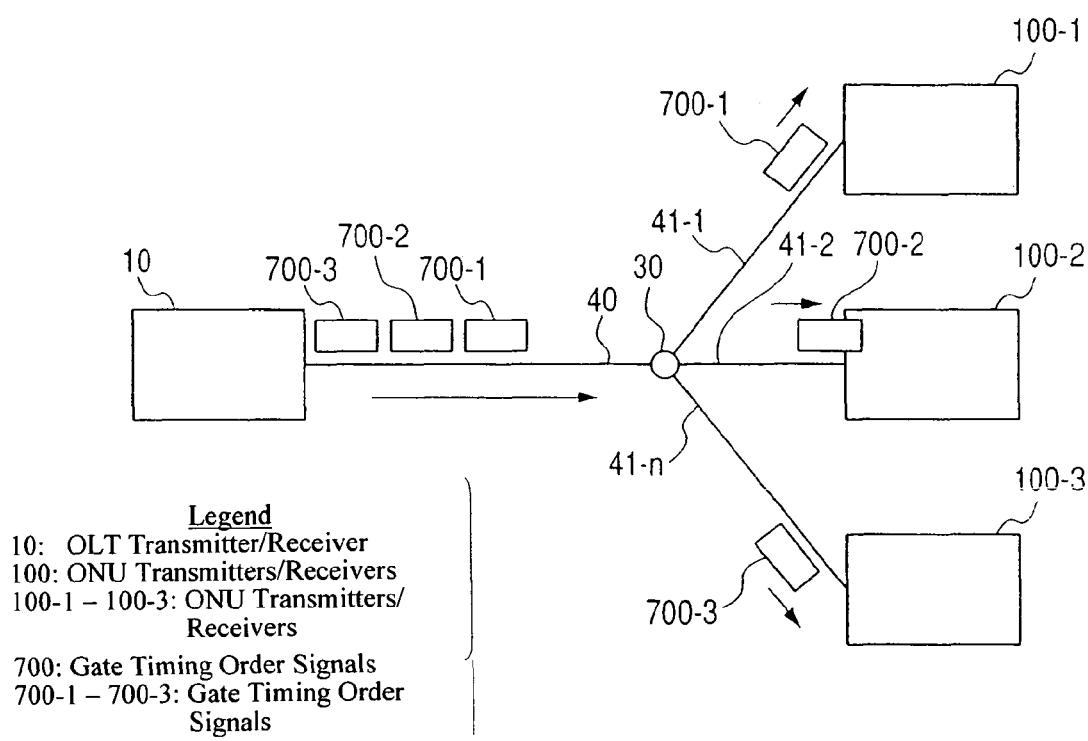
FIG. 3 shows a method of ordering transmission timings of upstream signals of the PON system according to one embodiment of the present invention.

FIG. 3 illustrates a way of giving order of transmission timing of an upstream signal in the PON system. The OLT transmitter/receiver 10 and the ONU transmitter/receiver 100 are connected via the optical fiber 40, the optical splitter 30, and the optical fiber 41, as the same with FIG. 1. The optical splitter 30 outputs signals with their power being superposed one on another. Therefore, when upstream signals from the plural ONU transmitters/receivers are input in the optical splitter at a same time, the signals are superposed one on another and output toward the OLT. The superposed signals cannot be separated in the OLT, therefore cannot be received correctly. Each ONU is required to control its transmission timing so that respective upstream signals arrive in the OLT at different timings without superposing one on another. A collision of upstream signals can be avoided by the ONT communicating a permission of transmitting a signal to the ONT, thereby designating a timing of transmitting a signal. FIG. 3 illustrates that the gate timing order signals 700 designate the timing of transmitting signals to each ONU.

Figure 4:
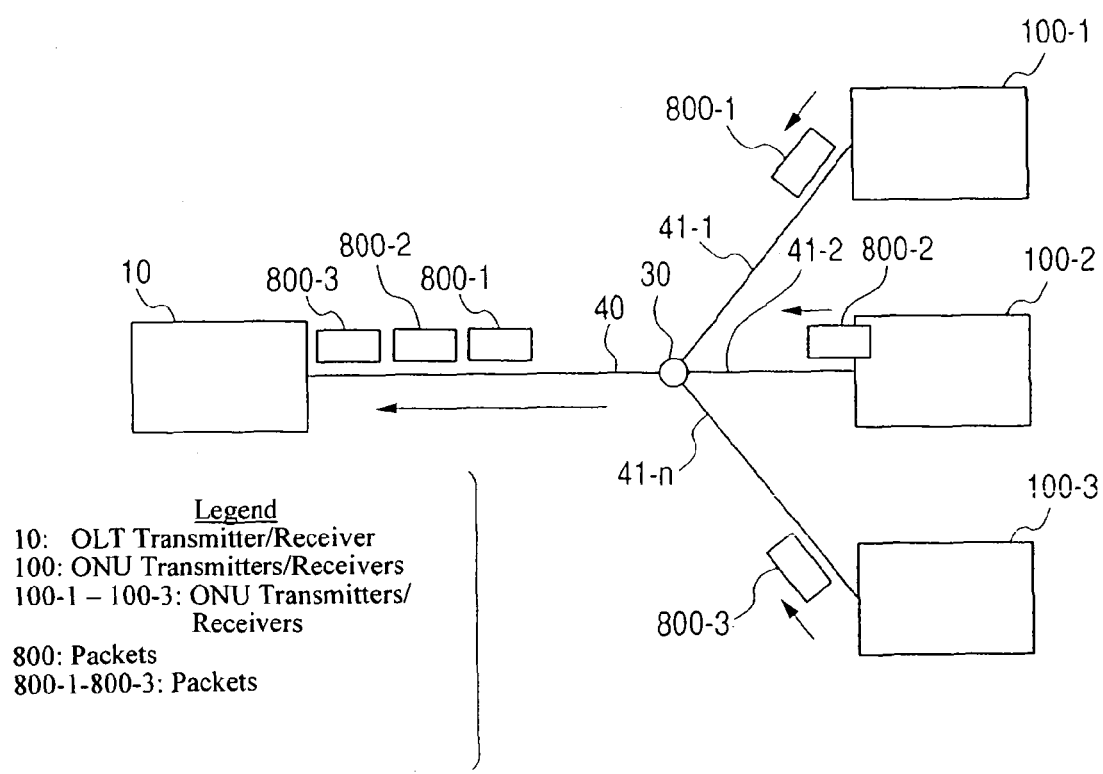
FIG. 4 shows collision avoidance of upstream signals of the PON system according to one embodiment of the present invention.

A cell or a packet 800 of an upstream signal output from the ONU is transmitted at a designated timing, therefore upstream signals do not collide with each other, as shown in FIG. 4.

Figure 5:
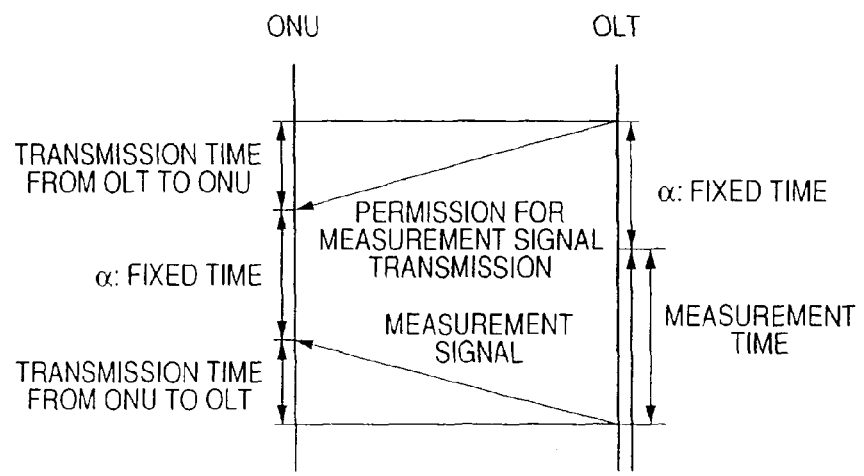
FIG. 5 shows a ranging time chart of the PON system according to one embodiment of the present invention.

In the PON system, the transmission distances between the OLT and each ONU are not identical and cannot be determined in advance. The OLT measures each transmission time between the OLT and each ONU in advance and memorizes the periods, thereby the OLT, after calculating the timings when an upstream signal from each ONU does not collide with each other, communicates the timings to each ONU. Such processing of measuring the transmission time is referred to as ranging, which is shown in FIG. 5. First, the OLT, after transmitting an order directing the ONU that a measure signal must be transmitted after α seconds, sets a ranging window after α seconds. Next, the ONU, after receiving the direction, transmits a measure frame after α seconds. By measuring the period when the measure signal arrives, the OLT recognizes the half the period as a direction transmission time. With the ranging, the OLT admits a certain upstream signal from a certain ONU within a certain period, therefore signals from other ONUs being prohibited. The OLT transmits/receives a measure signal to/from a certain ONU within the ranging window, and calculates the transmission time between the ONU from the arrival time. A measure signal from the ONU, which has a longer transmission time than that of the ranging window, cannot be received by the OLT. Accordingly, the area of the ranging window determines a maximum distance between the OLT and the ONU in the PON system. The maximum distance is referred to as the maximum logic distance, and is prescribed differently from the physical distance determined from the transmission/receive level and the transmission line loss of an optical signal.

In the PON system, a downstream signal is transmitted as a continuous signal by connecting packets or cells, therefore the ONU receiver is not remarkably different from a conventional optical transmission system. However, with respect to an upstream signal, since each ONU has a different clock phase and an optical intensity from each other, a signal the OLT receives is in a burst state and a dedicated burst signal receive circuit is needed in the OLT. In receiving a burst signal, the influence of a signal received immediately before must be excluded. In addition, the bit synchronization must be established with a single timing extracted from an overhead of a packet or a cell. Furthermore, the PON system is required to utilize the band efficiently on a best effort basis. With respect to a downstream signal, the OLT can detect a traffic addressed to each ONU on a network of a communication carrier; therefore the OLT can dynamically control a band by adjusting the magnitude or frequency of a packet or cell addressed to each ONU. However, in order to dynamically control a band of an upstream signal, a series of functions is needed, each ONU communicating a band that each ONU requests to the OLT, thereafter the OLT assigning the band to each ONU. The series of functions is referred to as a DBA (Dynamic Bandwidth Assignment). The DBA function not only increases the efficiency of utilization of an upstream band of the PON system, but also enables a voice signal and a video signal that are sensitive to the delay characteristics to be transmitted at a low delay.

Figure 6:
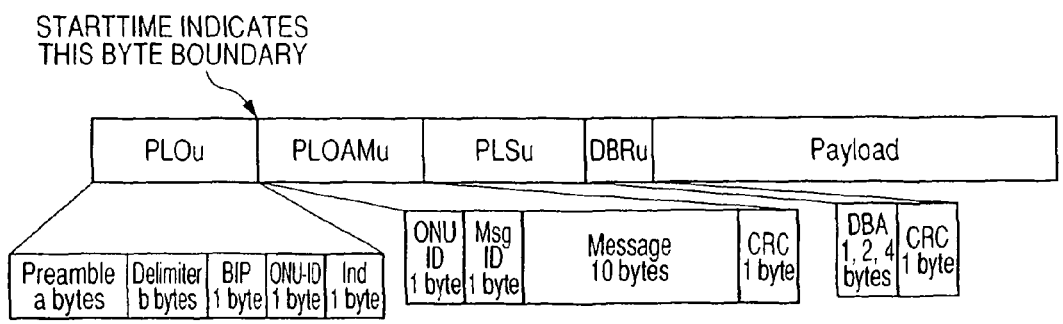
FIG. 6 shows the PON frame according to one embodiment of the present invention.

The PON system according to the present invention is to control an optical transmission power which is outputted from an optical transmission unit of an optical communication apparatus, so as to be a required minimum power that apparatuses of all subscribers of the optical communication system, meet a prescribed error rate. Thus, the ONU transmitter/receiver 100 in the system shown in FIG. 1, includes the power monitor 401 which monitors the optical power received from the output of an electronic signal converted by the optical receiver 105. The received power measured by the power monitor 401, is outputted in the received information transmitter 402, and the received information transmitter 402 transmits the received power information to the OLT transmitter/receiver 10 using the PLOAM (Physical Layer Operation Administration and Maintenance) of the PON frame, and extracts the power information stored in the PLOAM using the reception logic module 11, and controls the transmission optical output of the light source with modulation function 21 using the output power controller 301. The structure of the PON frame is shown in FIG. 6. As shown in the drawing, the PON frame is composed of PLOu (physical layer. overhead upstream), PLOAMu (Physical Layer Operation Administration and Maintenance upstream), PLSu (Power Leveling Sequence), DBRu (Dynamic Bandwidth Report), and Payload.

In the control, an optical transmission power of the light source with modulation function 21 is controlled so as to be the required minimum power that apparatuses of all subscribers of the optical communication system meet a prescribed error rate. That is, when the prescribed error rate is S, the optical transmission power $P_{min}$ is determined so as to be a minimum optical transmission power that meets S, because the optical transmission power and the error rate have a monotone decreasing relation. More specifically, $P_{min}$ can be determined by increasing the optical power S when the error rate is S or more, while by holding S constant optical power when the error rate is smaller than S. Thus, an optical communication system for access, which is excellent in the transmission quality, of low power consumption, simple and inexpensive, can be constituted.

As another embodiment of the present invention, an optical communication system for access which has the same advantages described above can be constituted by calculating the output information from the power monitor based on the SD (Single Degraded) information, and by controlling the output of the power monitor. The SD is transmitted by the PLOM shown in FIG. 6. In this case, the PON frame having the same structure as with a conventional one can be used; a major change is not needed in the frame processing method; and further the power monitor 401 and the receive information transmitter 402 are not necessarily required; therefore an optical communication system for access which has the same advantages as described above, can be constituted with a simpler structure.

As still another embodiment of the present invention, an optical communication system for access which has the same advantages described above can be constituted by calculating the output information from the power monitor based on the REIi (Remote Error Indication of ONTi) information, and by controlling the output of the power monitor. The REIi is transmitted by the PLOM shown in FIG. 6. In this case, the PON frame having the same structure as with a conventional one can be used; a major change is not needed in the frame processing method; and further the power monitor 401 and the receive information transmitter 402 are not necessarily required; therefore an optical communication system for access which has the same advantages as described above, can be constituted with a simpler structure.

Figure 9A:
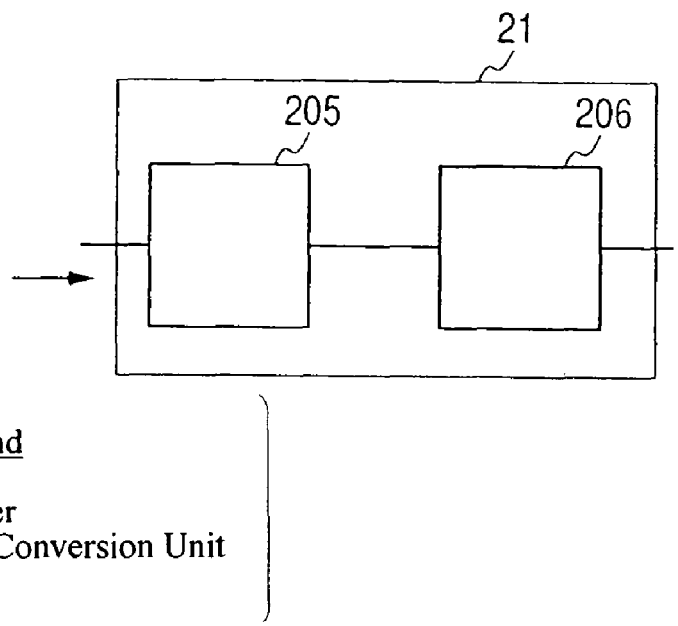
FIG. 9A shows an optical receiver and a light source with modulation function provided with an optical amplifier according to one embodiment of the present invention.
Figure 9B:
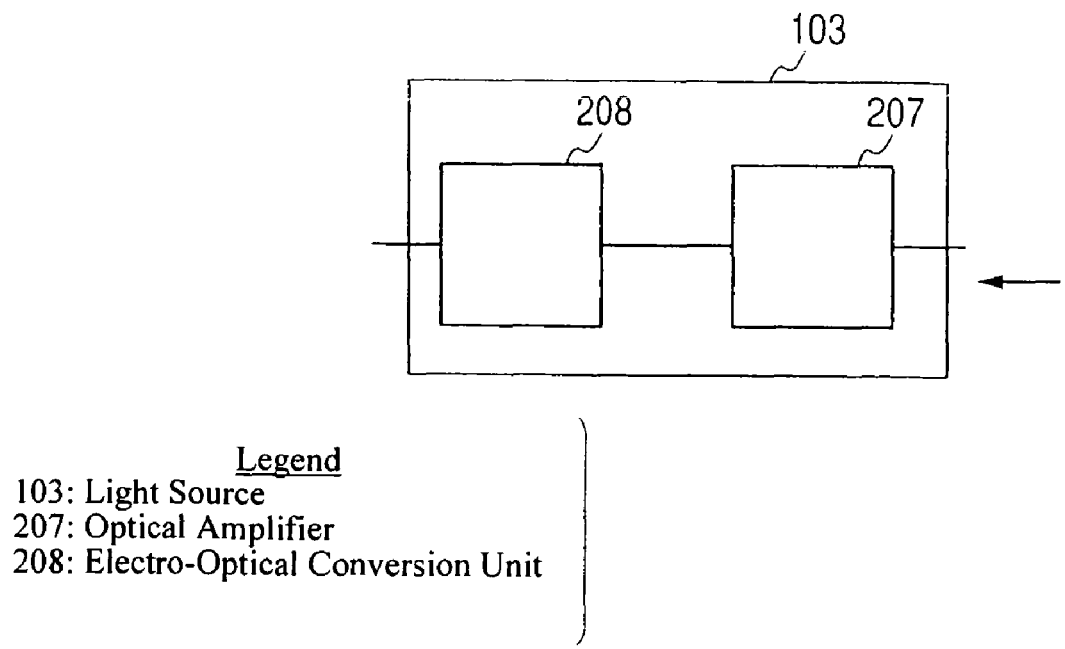
FIG. 9B shows an optical receiver and a light source with modulation function provided with an optical amplifier according to one embodiment of the present invention.

As still another embodiment of the present invention, the case where the light source with modulation function 21 is provided with an optical amplifier will be described. The structure is shown in FIGS. 9A and 9B. In this case, the light source with modulation function 21 further includes (FIG. 9A), an electro-optical conversion unit with modulation function 206 and an optical amplifier 205; the light source with modulation function 103 further includes (FIG. 9B) an electro-optical conversion unit with modulation function 208 and an optical amplifier 207. The electro-optical conversion unit with modulation function serves so that an electronic signal output from the transmission analog front ends 22 or 102, is converted to an optical signal, and the output optical signal is amplified by the optical amplifiers 205 and 207 to be output.

In this case, when a prescribed error rate is set to S, an output of an optical amplifier is controlled so as to be a minimum optical transmission power that meets S, because the optical transmission power and the error rate have a monotone decreasing relation. That is, when a prescribed error rate is set to S, the optical transmission power $P_{min}$ is determined so as to be a minimum optical transmission power that meets S, because the optical transmission power and the error rate have a monotone decreasing relation. More specifically, $P_{min}$ can be determined by increasing the optical power S when the error rate is S or more, while by holding S a constant optical power when the error rate is smaller than S.

Figure 7:
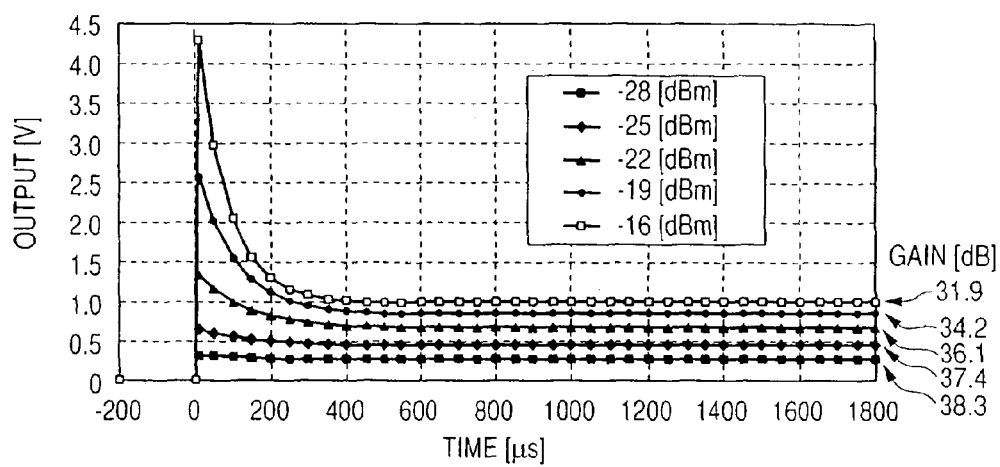
FIG. 7 shows a phenomenon of optical surge caused by an optical amplifier according to one embodiment of the present invention.
Figure 8:
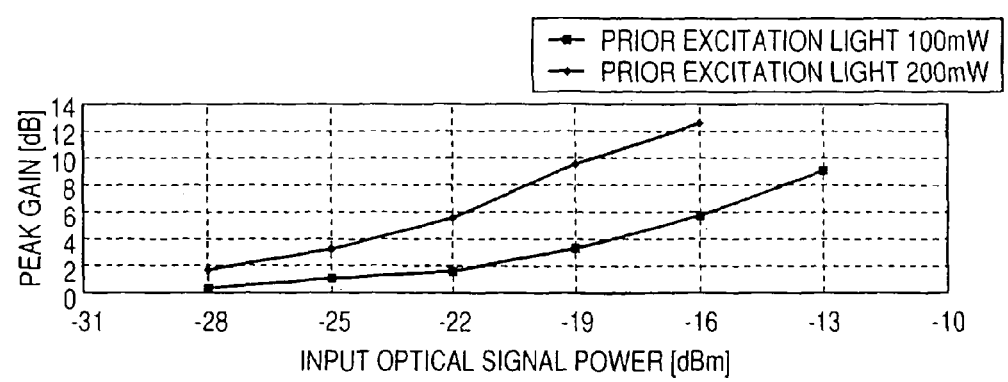
FIG. 8 shows dependency among a peak gain of an overshoot caused by an optical amplifier, an input optical signal power, and an excitation light power according to one embodiment of the present invention.

Herein, an optical surge will be described. An optical surge is a phenomenon in that an optical signal causes an overshoot by a high gain optical amplifier. Due to this phenomenon, there is a possibility that an optical receiver is destroyed. FIG. 7 shows the property of transient response of an optical amplifier measured by the inventor. In this case, the property of transient response was measured with a sampling oscilloscope when an optical signal input in an optical amplifier was switched on at a high speed. Herein, as an optical amplifier, an L-band Erbium-Doped Fiber Amplifier with bi-directional pumping was used. It can be understood that, as the input signal power increases by 3 dB each time from −28 dBm, the overshoot becomes greater in its height. In FIG. 8, two peak gains of the overshoot were shown; one was when providing 200 mW of prior excitation light, the other was 100 mW. From the results, it can be understood that, the overshoot can be remarkably reduced by halving an excitation light power, that is, by suppressing an output of an optical amplifier (or an excitation light power), the optical surge is able to be controlled. In other words, because of the present invention, an optical communication system without a surge problem can be practiced.

Operation in extending an ONU transmitter/receiver will be subsequently described. In the PON system, an operation for detecting an ONU operable after switch on, which is done for registering the ONU, is referred to as an auto-discovery. To carry out ranging in the auto-discovery, a newly installed ONU must obtain an optical signal of which receive sensitivity is greater than a prescribed one at which the ONU can communicate with the OLT. When the loss budget of the newly installed ONU is greater than that of the existing ONU, the auto-discovery sequence cannot be performed, because the power necessary for the newly installed ONU is small.

Therefore, in the present invention, the output power of the OLT is gradually increased on a regular basis, thereby, enabling an auto-discovery to be performed in installation of an ONU. Specifically, the output power of the OLT is controlled so as to be gradually increased first followed by being decreased to the above required minimum power $P_{min}$. Herein, the "gradually" means that the power is changed at a low speed to a point that the influence of a time constant of gain or output-control carried out in an optical receiver or a receiver analog end front in a conventional transmission system, occurs. The optical transmission power of the light source with modulation function 21 can be controlled so that apparatuses 100 of all subscribers of the optical communication system meet a prescribed error rate, even in installation of the apparatus.

With respect to the relation between the monitor and the timing of power control, some variations are possible. For example, a way of controlling the power can be practiced in which, during auto-discovery the output power is only to be changed gradually and the power control to obtain an optical signal having a receive sensitivity more than a prescribed one, is not carried out in all ONUs of the present invention.

Alternatively, other power control variations can be practiced. For example, a timing when only monitoring the power is done during operation without a power control to obtain an optical signal having a receive sensitivity more than a prescribed one, being carried out, and a timing when a power control to obtain an optical signal is done, are separately adopted.

Thus, according to the present invention, an optical communication system for access, which is excellent in the transmission quality, of low power consumption, simple and inexpensive, can be constituted.

As stated above, an optical communication apparatus and an optical communication system constituting a triple play service system which is excellent in transmission quality, of low power consumption, simple, inexpensive and highly-reliable, can be practiced by the present invention.

What is claimed is:

1. A network system in which an optical line terminating apparatus and a plurality of optical network apparatuses are connected together via an optical fiber, the optical line terminating apparatus comprising:
   a transmitter which transmits a respective signal to each of the plurality of optical network apparatuses; and
   a receiver which receives a signal from each of the optical network apparatuses that includes information related to an optical intensity of the respective signal received by the optical network apparatus from the transmitter,
   wherein the optical line terminating apparatus transmits data to the plurality of network apparatuses at an optical intensity calculated based on the information included in the signals received by the receiver from the plurality of optical network apparatuses, and the optical line terminating apparatus calculates the optical intensity as a minimum optical intensity of the optical intensities of the respective signals transmitted to the optical network apparatuses that is greater than a predetermined value.

2. The network system according to claim 1, wherein the predetermined value is an optical intensity which meets an error rate at which the optical network apparatuses receiving signals having the minimum optical intensity can receive the data.

3. The network system according to claim 1, wherein the information acquired from the plurality of optical network apparatuses, which is related to optical intensities of signals that the plurality of optical network apparatuses receive from the optical line terminating apparatus, is stored in an available byte of the PLOAM (Physical Layer Operation Administration and Maintenance) in a POM frame to be transmitted to the optical line terminating apparatus.

4. The network system according to claim 3, wherein the optical intensity at which the minimum optical intensity of the optical intensities of the plurality of optical network apparatuses is greater than the predetermined value, is calculated based on SD (Signal Degraded) information stored in the PLOAM.

5. The network system according to claim 3, wherein the optical at which a minimum optical intensity of optical intensities of signals which the plurality of optical network apparatuses receive is greater than the predetermined value, is calculated based on RELi (Remote Error Indication of ONTi) information stored in the PLOAM.

6. The network system according to claim 1, wherein the optical intensity at which an auto-discovery signal is transmitted to a newly installed optical network apparatus, is greater than the optical intensities at which data is transmitted to the plurality of optical network apparatuses.

7. The network system according to claim 6, wherein the auto-discovery signal is transmitted on a regular basis.

8. The network system according to claim 6, wherein the optical intensity of the auto-discovery signal is gradually increased until an auto-discovery is completed.

9. The network system according to claim 6, wherein the optical line terminating apparatus, when the auto-discovery is completed, transmits data to the newly installed optical network apparatus and the plurality of optical network apparatuses at an optical intensity calculated based on information acquired from the newly installed optical network apparatuses and the plurality of optical network apparatuses, which is related to optical intensities of signals that the newly installed optical network apparatus and the plurality of optical network apparatuses receive from the optical line terminating apparatus, the optical intensity being calculated as a minimum optical intensity of the optical intensities of the signals transmitted to newly installed optical network apparatus and the plurality of optical network apparatuses that is greater than a predetermined value.

10. The net work system according to claim 1, the optical line terminating apparatus further comprising:
   a controller which controls optical intensity of signals transmitted from the transmitter, and
   the plurality of optical network apparatuses each respectively comprising:
   a receiver which receives the respective signal transmitted from the optical line terminating apparatus to the optical network apparatus;
   a power monitor which measures an optical intensity of the received signal;
   a frame processor which stores information based on the optical intensity measured by the power monitor in a signal to be transmitted to the optical line terminating apparatus; and
   a transmitter which transmits the signal to the optical line terminating apparatus, wherein the controller thereof controls an optical intensity of a signal so that the signal is transmitted from the transmitter at the optical intensity calculated based on the information related to an optical intensity of the respective signal received by the optical network apparatus from the transmitter.

11. The network system according to claim 10, the transmitter of the optical line terminating apparatus comprising:
an optical amplifier which amplifies an optical intensity of signals output from the transmitter of the optical line terminating apparatus,
wherein the optical amplifier controls optical intensity so that signals are transmitted at an optical intensity calculated by the controller thereof.

12. A network system in which an optical line terminating apparatus and a plurality of optical network apparatuses are connected together via an optical fiber, the optical line terminating apparatus comprising:
a transmitter which transmits a respective signal to each of the plurality of optical network apparatuses; and
a receiver which, receives a signal from each of the optical network apparatuses that includes information related to an optical intensity of the respective signal received by the optical network apparatus from the transmitter, and
wherein the optical line terminating apparatus transmits data to the plurality of network apparatuses at an optical intensity calculated based on the information included in the signals received by the receiver from the plurality of optical network apparatuses, and the optical line terminating apparatus calculates the optical intensity as a minimum optical intensity of the optical intensities of the respective signals transmitted to the optical network apparatuses that is greater than a predetermined value, and
wherein an optical intensity of an auto-discovery signal which is transmitted to a newly installed optical network apparatus, is greater than the optical intensities at which data is transmitted to the plurality of optical network apparatuses.

13. The network system according to 12, wherein the auto-discovery signal is transmitted on a regular basis.

14. The network system according to claim 12, wherein the optical intensity of the auto-discovery signal is gradually increased until an auto-discovery is completed.

15. The network system according to claim 12, wherein the optical line terminating apparatus, when the auto-discovery is completed, transmits data to the newly installed optical network apparatus and the plurality of optical network apparatuses at an optical intensity calculated based on information acquired from the plurality of optical network apparatuses, which is related to optical intensities of signals that the newly installed optical network apparatus and the plurality of optical network apparatuses receive from the optical line terminating apparatus, the optical intensity being calculated as a minimum optical intensity of the optical intensities of the signals transmitted to newly installed optical network apparatus and the plurality of optical network apparatuses that is greater than a predetermined value.

16. A optical line terminating apparatus which is connected to a plurality of optical network apparatuses via an optical fiber, comprising:
a transmitter which transmits a respective signal to each of a plurality of optical network apparatuses; and
a receiver which receives a signal from each of the optical network apparatuses that includes information related to an optical intensity of the respective signal received by the optical network apparatus from the transmitter,
wherein the optical line terminating apparatus transmits data to the plurality of network apparatuses at an optical intensity, calculated based on the information included in the signals received by the receiver, at which a minimum optical intensity of the optical intensities of the respective signals that the plurality optical network apparatuses receive from the optical line terminating apparatus is greater than a predetermined value.

17. The optical line terminating apparatus according to claim 16, wherein the predetermined value is an optical intensity which meets an error rate at which the optical network apparatuses receiving signals having the minimum optical intensity can receive the data.

18. The optical line terminating apparatus according to claim 16, wherein information acquired from the plurality of optical network apparatuses, which is related to the optical intensity of signals which the plurality of optical network apparatuses receive from the optical line terminating apparatus, is stored in an available byte of the PLOAM (Physical Layer Operation Administrative Maintenance) in a PON frame transmitted from the plurality of optical network apparatuses.

19. The optical line terminating apparatus according to claim 18, wherein the optical intensity at which a minimum optical intensity of optical intensities of signals which the plurality of optical network apparatuses receive is greater than the predetermined value, is calculated based on SD (Signal Degraded) information stored in the PLOAM.

20. The optical line terminating apparatus according to claim 18, wherein the optical intensity at which a minimum optical intensity of optical intensities of signals which the plurality of optical network apparatuses receive is greater than the predetermined value, is calculated based on REIi (Remote Error Indication of ONTi) information stored in the PLOAM.

21. The optical line terminating apparatus according to claim 16, wherein the optical intensity at which an auto-discovery signal is transmitted to a newly installed optical network apparatus, is greater than the optical intensities at which data is transmitted to the plurality of optical network apparatuses.

22. The optical line terminating apparatus according to claim 21, wherein the auto-discovery signal is transmitted on a regular basis.

23. The optical line terminating apparatus according to claim 21, wherein the optical intensity of the auto-discovery signal is gradually increased until auto-discovery is completed.

24. The optical line terminating apparatus according to claim 21, wherein the optical line terminating apparatus, when the auto-discovery is completed, transmits data to the newly installed optical network apparatus and the plurality of optical network apparatuses at an optical intensity calculated based on information acquired from the newly installed optical network apparatus and the plurality of optical network apparatuses, which is related to optical intensities of signals that the newly installed optical network apparatus and the plurality of optical network apparatuses receive from the optical line terminating apparatus, the optical intensity being calculated as a minimum optical intensity of the optical intensities of the signals transmitted to newly installed optical network apparatus and the plurality of optical network apparatuses that is greater than a predetermined value.

25. The optical line terminating apparatus according to claim 16, the optical line terminating apparatus further comprising:

a controller which controls optical intensity of signals transmitted from the transmitter, wherein the controller thereof controls an optical intensity of a signal so that the signal is transmitted from the transmitter at the optical intensity calculated based on the information related to an optical intensity of the respective signal received by the optical network apparatus from the transmitter.

26. The optical line terminating apparatus according to claim 25, a transmitter of the optical line terminating apparatus comprising:

an optical amplifier which amplifies an optical intensity of signals output from the transmitter of the optical line terminating apparatus, wherein the optical amplifier controls optical intensity so that signals are transmitted at an optical intensity calculated by the controller thereof.

27. An optical line terminating apparatus connected to a plurality of optical network apparatuses via an optical fiber, the optical line terminating apparatus comprising:

a transmitter which transmits a respective signal to each of the plurality of optical network apparatuses; and a receiver which receives a signal from each of the optical network apparatuses that includes information related to an optical intensity of the respective signal received by the optical network apparatus from the transmitter, and wherein the optical line terminating apparatus transmits data to the plurality of network apparatuses at an optical intensity calculated based on the information included in the signals received by the receiver from the plurality of optical network apparatuses, and the optical line terminating apparatus calculates the optical intensity as a minimum optical intensity of the optical intensities of the respective signals transmitted to the optical network apparatuses that is greater than a predetermined value, and wherein an optical intensity of an auto-discovery signal which is transmitted to a newly installed optical network apparatus, is greater than the optical intensities at which data is transmitted to the plurality of optical network apparatuses.

28. The optical line terminating apparatus according to claim 27, wherein the auto-discovery signal is transmitted on a regular basis.

29. The optical line terminating apparatus according to claim 27, wherein an optical intensity of the auto-discovery signal is gradually increased until an auto-discovery is completed.

30. The optical line terminating apparatus according to claim 27, wherein the optical line terminating apparatus, when the auto-discovery is completed, transmits data to the newly installed optical network apparatus and the plurality of optical network apparatuses at an optical intensity calculated based on information acquired from the newly installed optical network apparatuses and the plurality of optical network apparatuses, which is related to optical intensities of signals that the newly installed optical network apparatus and the plurality of optical network apparatuses receive from the optical line terminating apparatus, the optical intensity being calculated as a minimum optical intensity of the optical intensities of the signals transmitted to newly installed optical network apparatus and the plurality of optical network apparatuses that is greater than a predetermined value.

31. An optical network apparatus connected to an optical line terminating apparatus via an optical fiber, the optical network apparatus comprising:

a receiver which receives a signal transmitted from the optical line terminating apparatus;

a power monitor which measures an optical intensity of the received signal;

a frame processor which stores information related to the optical intensity measured by the power monitor in a signal to be transmitted to the optical line terminating apparatus; and a transmitter which transmits the signal to the optical line terminating apparatus, wherein the receiver receives a signal from the optical line terminating apparatus at a minimum optical intensity calculated based on information related to a respective optical intensity stored in a respective signal received from each of a plurality of optical network apparatuses connected to the optical line terminating apparatus, the minimum optical intensity being calculated based on the information included in the respective signals from the plurality of optical network apparatuses so that a receive sensitivity of a signal which the plurality of optical network apparatuses receive is greater than a predetermined value.

32. The optical network system according to claim 31, wherein the information related to an optical intensity measured by the power monitor is stored in an available byte of the PLOAM (Physical Layer Operation Administration and Maintenance) in a PON frame to be transmitted to the optical line terminating apparatus.

33. The optical network system according to claim 31, wherein the information related to an optical intensity measured by the power monitor is stored in SD (Signal Degraded) information of the PLOAM.

34. The optical network system according to claim 31, wherein the information related to an optical intensity measured by the power monitor, is stored in RELi (Remote Error Indication of ONTi) information.

* * * * *